(12) United States Patent
Sharpe

(10) Patent No.: US 9,021,784 B1
(45) Date of Patent: May 5, 2015

(54) THERMODYNAMIC LOUVERED JET ENGINE

(71) Applicant: Thomas H. Sharpe, North Augusta, SC (US)

(72) Inventor: Thomas H. Sharpe, North Augusta, SC (US)

(*) Notice: Subject to any disclaimer, the term of this patent is extended or adjusted under 35 U.S.C. 154(b) by 128 days.

(21) Appl. No.: 14/179,029

(22) Filed: Feb. 12, 2014

(51) Int. Cl.
| | |
|---|---|
| *F02K 7/00* | (2006.01) |
| *F02C 3/34* | (2006.01) |
| *F02K 7/10* | (2006.01) |
| *F02K 7/12* | (2006.01) |
| *F02K 7/08* | (2006.01) |
| *F02C 7/04* | (2006.01) |

(52) U.S. Cl.
CPC ... *F02C 3/34* (2013.01); *F02C 7/04* (2013.01); *F02K 7/10* (2013.01); *F02K 7/12* (2013.01); *F02K 7/08* (2013.01)

(58) Field of Classification Search
CPC .............. F02K 7/08; F02K 7/10; F02K 7/12; F02C 3/34; F02C 7/04; F23C 9/00; F05D 2220/10
USPC .................................. 60/262, 269, 39.52, 267
See application file for complete search history.

(56) References Cited

U.S. PATENT DOCUMENTS

| | | | | |
|---|---|---|---|---|
| 2,920,445 | A * | 1/1960 | Bailey | 60/262 |
| 2,920,448 | A * | 1/1960 | Coanda | 60/39.49 |
| 3,323,304 | A * | 6/1967 | Ljobet et al. | 60/39.49 |
| 3,750,400 | A * | 8/1973 | Sharpe | 60/269 |
| 3,800,529 | A * | 4/1974 | Sharpe | 60/241 |
| 3,800,531 | A * | 4/1974 | Sharpe | 60/263 |
| 3,925,981 | A * | 12/1975 | Etessam | 60/39.77 |
| 4,085,585 | A * | 4/1978 | Sharpe | 60/262 |
| 4,118,929 | A * | 10/1978 | Sharpe | 60/262 |
| 4,267,694 | A * | 5/1981 | Sharpe | 60/269 |
| 4,644,796 | A | 2/1987 | Ward | |
| 4,689,950 | A * | 9/1987 | Minardi et al. | 60/204 |
| 5,417,057 | A * | 5/1995 | Robey | 60/269 |
| 6,981,366 | B2 * | 1/2006 | Sharpe | 60/269 |
| 7,111,449 | B1 * | 9/2006 | Stebbings | 60/269 |
| 8,250,854 | B2 * | 8/2012 | Sharpe | 60/269 |
| 8,272,221 | B2 * | 9/2012 | Sharpe | 60/780 |

FOREIGN PATENT DOCUMENTS

FR        1007027 A  *  4/1962  ............... F02K 7/08

* cited by examiner

*Primary Examiner* — Phutthiwat Wongwian
*Assistant Examiner* — Jason H Duger
(74) *Attorney, Agent, or Firm* — Richard C Litman

(57) ABSTRACT

The thermodynamic louvered jet engine is a jet engine having a central air inlet surrounded by an annular air inlet. Both inlets are adapted to receive relatively cool, low-pressure air and to convey the air to a combustion chamber to mix and combust with injected jet fuel. The annular inlet is provided with a louvered outlet for directing the air to the combustion chamber. A portion of the hot combustion gases produced in the combustion chamber is circulated from the combustion chamber to mix with the inlet air supplied via the annular air inlet. Also, the central air inlet is provided with structure that directs a portion of the air from the central air inlet to mix with the circulated combusted gases. This arrangement permits the engine to develop a high-pressure build-up of exhaust gases, producing superior thrust while the aircraft is setting and while the aircraft is in flight.

15 Claims, 2 Drawing Sheets

THERMODYNAMIC LOUVERED JET ENGINE

BACKGROUND OF THE INVENTION

1. Field of the Invention

The present invention generally relates to jet engines, and particularly to a thermodynamic louvered jet engine having no internal moving parts.

2. Description of the Related Art

Broadly defined, a jet engine is a motive device that generates forward thrust by discharging combusted gases in a rearward direction. Since the jet engine preforms at speeds and efficiency much greater than propeller driven engines, the commercial aircraft industry and the military utilize the engine as the primary propulsion engine for its fleet of aircraft. Heretofore, the most commonly employed jet engine has been the turbine-type jet engine. While the turbine-type engine has proven to be efficient and effective, the high degree of heat and stress placed on the moving turbine parts create an environment that can lead to deterioration and failure of the moving parts. The turbine-type engine must therefore be subjected to relatively frequent inspections and part replacements to maintain engine reliability and safety. The frequent inspections result in engine down-time and correlated expenses. Another jet engine type (in limited use) is the ramjet engine which has no moving parts. However, while extremely capable at high speeds, the ramjet engine cannot produce thrust at zero or very low airspeeds and thus cannot move an aircraft from a standstill position.

The commercial aircraft and military industries would certainly embrace a jet engine that requires no turbine and thus, with the exception of fuel pumps and ancillary devices for start-up ignition, has no internal moving parts. Thus, a thermodynamic louvered jet engine solving the aforementioned problems is desired.

SUMMARY OF THE INVENTION

The thermodynamic louvered jet engine is a jet engine having a central air inlet surrounded by an annular air inlet. Both inlets are adapted to receive relatively cool, low-pressure air and convey the air to a combustion chamber to mix and combust with injected jet fuel. The annular inlet is provided with a louvered structure for receiving the air to be directed to the combustion chamber. A portion of the hot combustion gases produced in the combustion chamber is circulated from the combustion chamber to mix with the inlet air supplied via the annular air inlet. Also, the central air inlet is provided with structure that directs a portion of the air from the central air inlet to mix with the circulated combusted gases. This thermodynamic arrangement permits the engine to develop a high-pressure buildup of exhaust gases, producing a superior thrust with minimum input of fuel whether the aircraft is setting or in flight.

Accordingly, the invention presents a jet engine that is low-cost, low-weight, and low-maintenance. The engine is more efficient than the jet engines currently in use requiring only a small percentage of combusted gases to power the engine. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
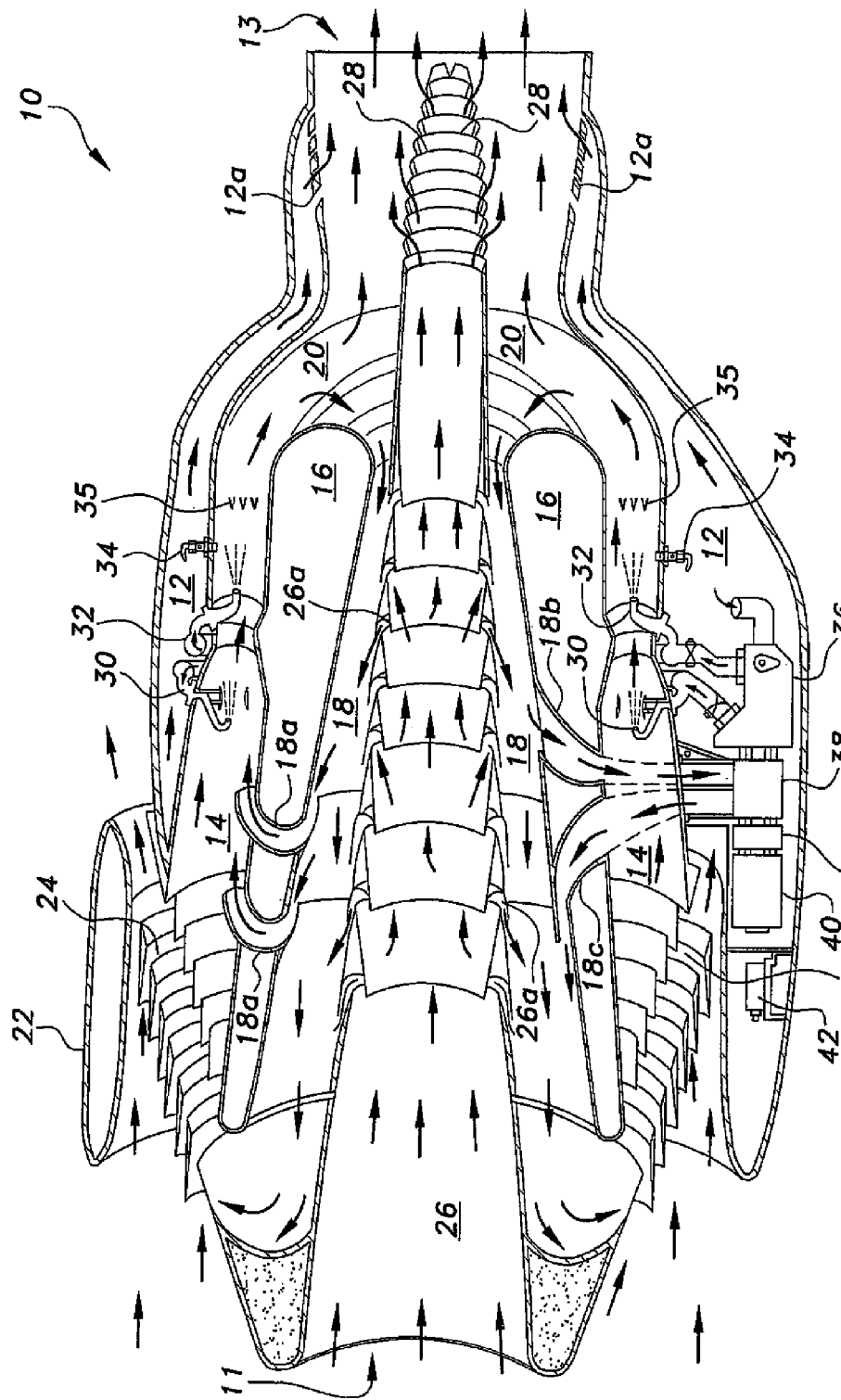
FIG. 1 is a diagrammatic side view in section of a thermodynamic louvered jet engine according to the present invention.
Figure 2:
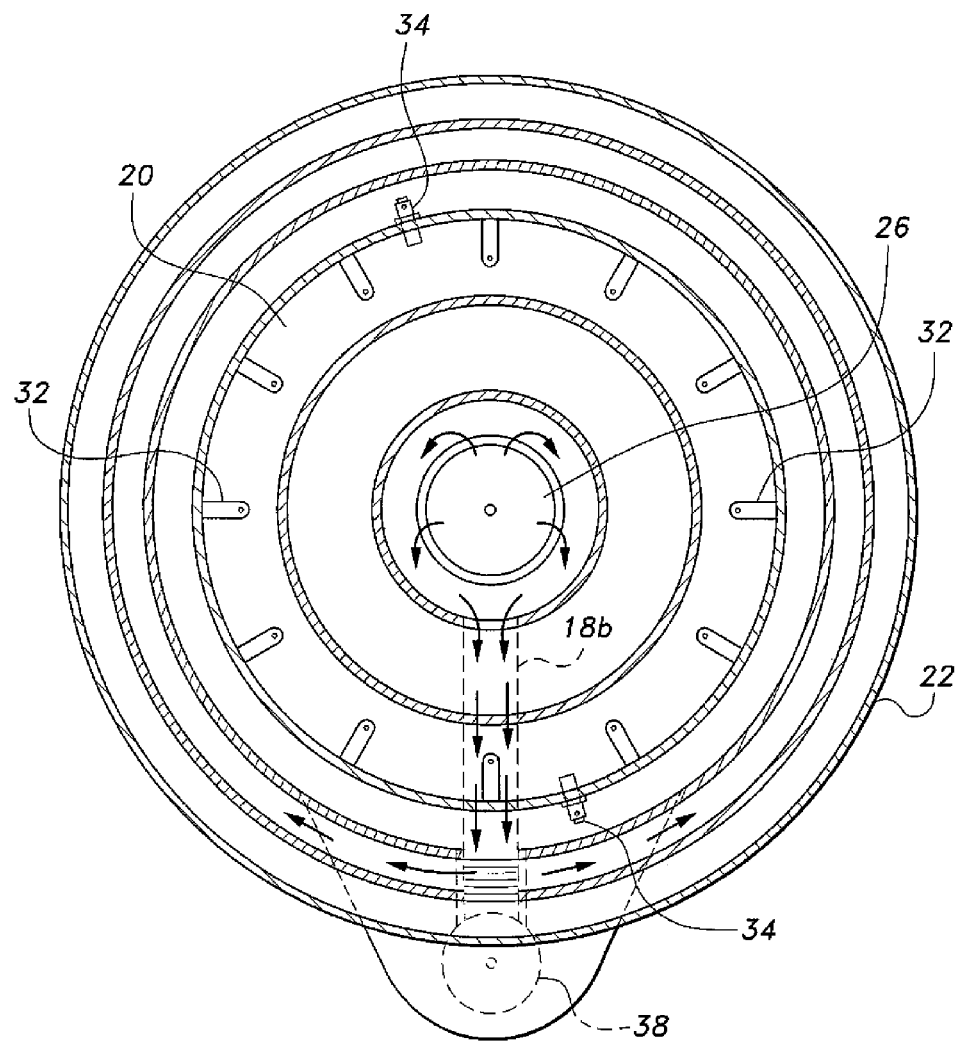
FIG. 2 is a front view in section of a thermodynamic louvered jet engine according to the present invention, taken approximately through a combustion chamber portion of the engine.

With reference to FIGS. 1 and 2 of the drawings, the thermodynamic louvered jet engine is generally indicated at 10. The engine 10 has an inlet end and an exhaust end, generally indicated at 11 and 13, respectively. A plurality of annularly arranged cowlings define annular concentric chambers 12, 14, 16, 18, 20 and a central air inlet chamber 26. Chambers 12 and 16 are interconnected and receive relatively low-pressure air via a nozzle ring 22. The air flow in chambers 12 and 16 is primarily for cooling purposes. Air exits chamber 12 via openings 12a at the exhaust end 13 of the engine. Low pressure ambient air enters annular chamber 14 via a plurality of louvers 24. The air from chamber 14 flows into combustion chamber 20. Low pressure ambient air also is supplied through the central chamber 26. The central chamber 26 is provided with flow directors 26a along the length thereof that reverse the flow of a portion of the centrally supplied low pressure air and inject that portion into recirculating hot combustion gases, as will be explained below. The central air chamber 26 is provided with louvered exit openings at 28, whereby the remaining portion of the centrally supplied low pressure air flows into exhaust gases exiting from the combustion chamber 20. Chamber 18 is a recirculation chamber that receives a portion of the combustion gases from the combustion chamber 20. Ducts 18a direct a portion of the recirculating gases to air chamber 14.

Fuel is supplied to the combustion chamber 20 through two banks of fuel nozzles 30 and 32. Each bank consists of twelve (12) nozzles radially spaced around the circumference of the cowling that defines the combustion chamber 20. Nozzles 30 supply fuel to the combustion chamber during engine start-up. Nozzles 32 supply fuel to the combustion chamber 20 when the engine is running. Nozzles 32 are positioned downstream of nozzles 30. A pair of igniters 34 ignites the mixture of fuel and air as it enters the combustion chamber 20. The igniters are substantially diametrically opposed and are positioned downstream of the run nozzles 34. A flame holder 35 is positioned to slow a portion of the air-fuel mixture and stabilize combustion in the combustion chamber 20.

A fuel pump 36 is provided to supply fuel to nozzles 30, 32. The fuel pump 36 is powered by a gas motor 38. The shaft of the gas motor 38 is connected to a conventional constant speed drive device (CSD) 39, which, in turn, drives an electric generator 40. A central processor and battery unit (CPU) 42 are arranged to drive the generator and fuel pump at start-up. A duct 18b directs a portion of the recirculating gases from chamber 18 to drive a gas motor 38. Duct 18c returns the gases to the recirculation chamber. Pump 36, motor 38, CDS 39, generator 40 and CPU 42 are positioned in chamber 12 to be cooled by the cooling air.

In use, the central processor unit 42 is programmed to initially start the engine utilizing battery power to drive electric generator 40, which, in turn, operates the fuel pump 36, the gas motor 38, and igniters 34. Operation of the gas motor 38 will cause ambient air to be drawn into the engine to mix with the fuel being injected from starter nozzles 30. The starting mixture is burned in the combustion chamber 20 to produce combustion gases. A portion of the combustion gases is recirculated through chamber 18 and duct 18b. The gases traversing duct 18b will now drive the gas motor 38, which drives the fuel pump 36 and electric generator 40. As the engine 10 progresses to a desired operating condition, the central processing unit (CPU) 42 will cause fuel to be pumped to run nozzles 32, eliminate the amount of energy supplied by the batteries, and rely on the recirculating combustion gases to drive the electric generator 40. A portion of the recirculating gases is routed through ducts 18a and to areas adjacent louvers 24 to mix with ambient air entering chamber 14. A portion of the ambient air entering the central chamber 26 is diverted by flow directors 26a to mix with the combustion gases in chamber 18. As indicated above, the air flow arrangement and mixing of recirculated combustion gases therewith produce a thermodynamic effect that enhances the efficiency of the engine and creates thrust, even when the aircraft is standing still.

It is to be understood that the present invention is not limited to the embodiments described above, but encompasses any and all embodiments within the scope of the following claims.

I claim:

1. A thermodynamic louvered jet engine, comprising:
   a first air chamber having an inlet end and an outlet end, the inlet end being exposed to ambient air;
   a combustion chamber, the first air chamber having a length extending through the combustion chamber for directing ambient air from the inlet end to the outlet end;
   a second air chamber surrounding the first air chamber, the second air chamber having an inlet end and an outlet end, the outlet end of the second air chamber being in fluid communication with the combustion chamber;
   a plurality of louvers positioned adjacent the inlet end of the second air chamber, the plurality of louvers being exposed to ambient air and being adapted to receive ambient air therethrough for flow into the second air chamber;
   means for injecting fuel into the combustion chamber to form a mixture with air flowing through the second chamber;
   igniters positioned in the combustion chamber for igniting the mixture;
   a combustion gas recirculation chamber surrounding the first air chamber, the combustion gas recirculation chamber having an inlet end in fluid communication with the combustion chamber for receiving a portion of combustion gases from the combustion chamber and an outlet end positioned adjacent the louvers; and
   a third air chamber surrounding said combustion gas recirculation chamber, the third air chamber being interposed between said second air chamber and said combustion gas recirculation chamber, the third air chamber receiving cooling air for the engine.

2. The thermodynamic louvered jet engine according to claim 1, further including a fourth air chamber surrounding said second air chamber, the fourth air chamber receiving cooling air for the engine.

3. The thermodynamic louvered jet engine according to claim 1, wherein said means for injecting fuel into said combustion chamber include a first bank and a second bank of injector nozzles, each of the banks having twelve respective injector nozzles spaced around said combustion chamber.

4. The thermodynamic louvered jet engine according to claim 1, further including ducts extending from said combustion gas recirculation chamber to said second air chamber for directing a portion of the combustion gases from said combustion gas recirculation chamber to said second air chamber.

5. The thermodynamic louvered jet engine according to claim 1, further including flow directors extending along the length of said first air chamber for directing a portion of the ambient air to said combustion gas recirculation chamber.

6. The thermodynamic louvered jet engine according to claim 1, wherein said engine has an exhaust end and wherein the outlet end of said first air chamber is positioned adjacent the exhaust end.

7. The thermodynamic louvered jet engine according to claim 1, further including:
   a fuel pump for supplying fuel to said means for injecting fuel;
   an electric generator for supplying electric power to said igniters; and
   a gas motor for driving the fuel pump and the electric generator.

8. The thermodynamic louvered jet engine according to claim 7, further including a duct extending from said combustion gas recirculation chamber to said gas motor for supplying combustion gases to drive said gas motor.

9. A thermodynamic louvered jet engine not containing a turbine, comprising:
   a first air chamber having an inlet end and an outlet end, the inlet end being exposed to ambient air;
   a combustion chamber, the first air chamber having a length extending through the combustion chamber for directing ambient air from the inlet end to the outlet end;
   a second air chamber surrounding the first air chamber, the second air chamber having an inlet end and an outlet end, the outlet end of the second air chamber being in fluid communication with the combustion chamber;
   a plurality of louvers positioned adjacent the inlet end of the second air chamber, the louvers being exposed to ambient air and being adapted to receive ambient air therethrough for flow into the second air chamber;
   means for injecting fuel into the combustion chamber to form a mixture with air flowing through the second chamber;
   igniters positioned in the combustion chamber for igniting the mixture;
   a combustion gas recirculation chamber surrounding the first air chamber, the combustion gas recirculation chamber having an inlet end in fluid communication with the combustion chamber for receiving a portion of combustion gases from the combustion chamber and an outlet end positioned adjacent the louvers;
   a third air chamber surrounding the second air chamber, the third air chamber receiving cooling air for the engine; and
   a fourth air chamber surrounding the combustion gas recirculation chamber, the fourth air chamber being interposed between the second air chamber and the combustion gas recirculation chamber, the fourth air chamber receiving cooling air for the engine.

10. The thermodynamic louvered jet engine according to claim 9, wherein said means for injecting fuel into said combustion chamber include a first bank and a second bank of injector nozzles, each of the banks having twelve respective injector nozzles spaced around said combustion chamber.

11. The thermodynamic louvered jet engine according to claim 9, further including ducts extending from said combustion gas recirculation chamber to said second air chamber for directing a portion of said combustion gases from said combustion gas recirculation chamber to said second air chamber.

12. The thermodynamic louvered jet engine according to claim 9, further including flow directors extending along the length of said first air chamber for directing a portion of said ambient air to said combustion gas recirculation chamber.

13. The thermodynamic louvered jet engine according to claim 9, wherein said engine has an exhaust end and wherein the outlet end of said first air chamber is positioned adjacent the exhaust end.

14. The thermodynamic louvered jet engine according to claim 9, further including:
   a fuel pump for supplying fuel to said means for injecting fuel;
   an electric generator for supplying electric power to said igniters; and
   a gas motor for driving the fuel pump and the electric generator.

15. The thermodynamic louvered jet engine according to claim 14, further including a duct extending from said combustion gas recirculation chamber to said gas motor for supplying combustion gases to drive said gas motor.

\* \* \* \* \*